(12) United States Patent
Xiong et al.

(10) Patent No.: US 11,927,094 B2
(45) Date of Patent: Mar. 12, 2024

(54) COMPREHENSIVE GEOLOGICAL-ENGINEERING CLASSIFICATION EVALUATION METHOD FOR LOW-PERMEABILITY RESERVOIRS

(71) Applicant: Southwest Petroleum University, Sichuan (CN)

(72) Inventors: Jian Xiong, Sichuan (CN); Xiangjun Liu, Sichuan (CN); Lixi Liang, Sichuan (CN); Yi Ding, Sichuan (CN); Linlin Huang, Sichuan (CN); Lianlang Hou, Sichuan (CN); Shiqiong Liu, Sichuan (CN); Hongqi Liu, Sichuan (CN)

(73) Assignee: Southwest Petroleum University, Sichuan (CN)

( * ) Notice: Subject to any disclaimer, the term of this patent is extended or adjusted under 35 U.S.C. 154(b) by 0 days.

(21) Appl. No.: 17/551,164

(22) Filed: Dec. 14, 2021

(65) Prior Publication Data
US 2022/0106876 A1 Apr. 7, 2022

(30) Foreign Application Priority Data
Dec. 14, 2020 (CN) .......................... 202011466585.8

(51) Int. Cl.
*E21B 49/00* (2006.01)
*G01V 99/00* (2009.01)
(Continued)

(52) U.S. Cl.
CPC .............. *E21B 49/00* (2013.01); *G01V 99/00* (2013.01); *G06F 30/28* (2020.01); *E21B 43/26* (2013.01);
(Continued)

(58) Field of Classification Search
CPC .......... E21B 49/00; E21B 43/26; E21B 43/00; E21B 2200/20; E21B 43/16;
(Continued)

(56) References Cited

U.S. PATENT DOCUMENTS

| 8,776,895 B2 * | 7/2014 | Li | G06F 30/28 |
| | | | 703/10 |
| 10,444,389 B2 * | 10/2019 | Sayers | G01V 1/282 |

(Continued)

FOREIGN PATENT DOCUMENTS

| CN | 104747185 A | * | 7/2015 | ............. E21B 49/00 |
| CN | 106156452 A | * | 11/2016 | |
| CN | 111242490 A | * | 6/2020 | ......... G06F 8/23213 |

OTHER PUBLICATIONS

Long Zhangliang et al, Evaluation method for shale reservoir compressibility based on grey correlation analysis, Oil and Gas Reservoir Evaluation and Development, Feb. 2020, vol. 10, No. 1, pp. 37-42.

(Continued)

*Primary Examiner* — Jeffrey P Aiello

(57) ABSTRACT

A comprehensive geological-engineering classification evaluation method for low-permeability reservoirs, includes: constructing geological classification evaluation indexes of a reservoir: adopting gray correlation method to obtain main controlling factors of reservoir geology of the low-permeability reservoirs that affects fracturing effects; based on the main controlling factors of the reservoir geology, constructing the geological classification evaluation indexes of low-permeability reservoirs by principal component analysis; constructing engineering classification evaluation indexes of the reservoir: adopting gray correlation method to obtain main controlling factors of geomechanics of the low-permeability reservoirs that affects fracturing effects; based on the main controlling factors of (Continued)

geomechanics, constructing the engineering classification evaluation indexes of low-permeability reservoirs by an analytic hierarchy process; and according to classification limit values of the geological classification evaluation indexes of a reservoir and engineering classification evaluation indexes of a reservoir, achieving classification of reservoir types.

6 Claims, 2 Drawing Sheets

(51) Int. Cl.
    *G06F 30/28*     (2020.01)
    *E21B 43/26*     (2006.01)
    *G06F 113/08*     (2020.01)

(52) U.S. Cl.
    CPC ....... *E21B 2200/20* (2020.05); *G06F 2113/08* (2020.01)

(58) Field of Classification Search
    CPC .... E21B 49/003; G01V 99/00; G01V 99/005; G01V 2210/66; G01V 2210/646; G01V 11/00; G01V 2210/6242; G01V 2210/663; G01V 1/302; G01V 1/301; G01V 2210/624; G06F 30/28; G06F 17/16; G06F 17/18; G06F 30/27; G06F 2113/08; G06F 18/23213; G06F 16/906; G06F 2218/12; G06F 18/24; G06Q 10/06393; G06Q 50/06; G06N 3/08
    USPC ...... 166/250.01–250.2, 250.16, 264; 175/50; 345/419; 367/38, 73; 702/2, 6, 9–11, 13; 703/2, 6–7, 10
See application file for complete search history.

(56) References Cited

U.S. PATENT DOCUMENTS

| | | | |
|---|---|---|---|
| 2011/0060572 A1* | 3/2011 | Brown | E21B 49/00 703/10 |
| 2011/0108271 A1* | 5/2011 | Hinkel | C09K 8/584 166/270.1 |
| 2017/0205531 A1* | 7/2017 | Berard | G01V 11/00 |
| 2019/0212460 A1* | 7/2019 | Zhao | G01V 1/302 |
| 2021/0002999 A1* | 1/2021 | Yue | E21B 43/00 |

OTHER PUBLICATIONS

Ying Tang et al, Influencing factors and evaluation methods of fractability of shale reservoirs, Geoscience Frontier, Sep. 2012 vol. 19, No. 5, pp. 356-363.

* cited by examiner

COMPREHENSIVE GEOLOGICAL-ENGINEERING CLASSIFICATION EVALUATION METHOD FOR LOW-PERMEABILITY RESERVOIRS

CROSS REFERENCE OF RELATED APPLICATION

The present application claims priority under 35 U.S.C. 119(a-d) to CN 202011466585.8, filed Dec. 14, 2020.

BACKGROUND OF THE PRESENT INVENTION

Field of Invention

The present invention relates to the technical field of production-increasing reformation of exploited wells, and more particular to a comprehensive geological-engineering classification evaluation method for low-permeability reservoirs.

Description of Related Arts

During the production of low permeability reservoirs, fracturing is an important means of increasing production. As an important measure to increase production, hydraulic fracturing has the characteristics of high risk and high cost. In order to improve the efficiency of reservoir reconstruction, it is necessary to reasonably analyze the main controlling factors and predict the fracturing effect in advance, so as to provide a design basis for fracturing well selection and fracturing construction parameter selection. This shows that the evaluation of fracturing effect is particularly important.

There are many factors influencing the effect of fracturing, including geological factors of reservoirs, geo-mechanical factors, and fracturing construction factors. At present, there are many studies on the main controlling factors of reservoir fracturing effect, but how to classify the effect of reservoir fracturing, there is no rational evaluation method.

SUMMARY OF THE PRESENT INVENTION

In order to solve the technical problems mentioned above, the present invention provides a comprehensive geological-engineering classification evaluation method for low-permeability reservoirs.

The present invention is achieved by the technical solutions as follows.

A comprehensive geological-engineering classification evaluation method for low-permeability reservoirs, comprises steps of:

constructing geological classification evaluation indexes of a reservoir: adopting gray correlation method to obtain main controlling factors of reservoir geology of the low-permeability reservoirs that affects fracturing effects; based on the main controlling factors of the reservoir geology, constructing the geological classification evaluation indexes of low-permeability reservoirs by principal component analysis;

constructing engineering classification evaluation indexes of the reservoir: adopting gray correlation method to obtain main controlling factors of geomechanics of the low-permeability reservoirs that affects fracturing effects; based on the main controlling factors of geomechanics, constructing the engineering classification evaluation indexes of low-permeability reservoirs by an analytic hierarchy process; and according to classification limit values of the geological classification evaluation indexes of a reservoir and engineering classification evaluation indexes of a reservoir, achieving comprehensive geological-engineering classification of reservoir types.

Preferably, the step of constructing geological classification evaluation indexes of a reservoir comprising:

S1: by the grey correlation analysis method, calculating a correlation degree between reservoir geological factors and rice production index to obtain the main controlling factors of the reservoir geology S2: by the principal component analysis, constructing the geological classification evaluation indicators of low-permeability reservoirs.

Preferably, the reservoir geological factors comprises: permeability, pore structure index, porosity, resistivity, acoustic time, shale content, formation pore pressure and density.

Preferably, the pore structure index is calculated by a formula (2):

$$PIS = 1.075 \times (AC+CNL)/DEN - 0.45 \times V_{SH} - 27.745 \quad (2)$$

wherein in formula (2), PIS is the pore structure index, AC is the acoustic time, VSH is the shale content, CNL is neutrons, and DEN is density;

the formation pore pressure is calculated by a formula (3);

$$P_P = \sigma_V - \sigma_e \quad (3)$$

$$\sigma_e = 0.00556 DEPTH + 0.09717 AC + 11.2367 \ln(GR) - 64.7978 \quad (4)$$

wherein AC is the acoustic time, GR is natural gamma, $\sigma_v$ is a pressure of an overlying strata, $\sigma_e$ is an effective stress.

Preferably, the step of constructing engineering classification evaluation indexes of the reservoir comprises:

S1: by the grey correlation analysis method, calculating a correlation degree between geomechanics factors and rice production index to obtain the main controlling factors of the geomechanics;

S2: by the analytic hierarchy process, constructing the geological classification evaluation indicators of low-permeability reservoirs.

Preferably, the geomechanical factors comprise: horizontal stress difference, brittleness index, elastic modulus, tensile strength, uniaxial compressive strength, horizontal maximum principal stress, horizontal minimum principal stress, and Poisson's ratio.

Preferably, according to formula (6), a horizontal maximum principal stress $\sigma_H$ and a horizontal minimum principal stress $\sigma_h$ are calculated; and according to formula (8), horizontal ground stress difference $\Delta\sigma$ is calculated;

$$\begin{cases} \sigma_H = \dfrac{\mu}{1-\mu}\sigma_V + \dfrac{1-2\mu}{1-\mu}\alpha P_P + \dfrac{E}{1-\mu^2}\varepsilon_H + \dfrac{\mu E}{1-\mu^2}\varepsilon_h \\ \sigma_h = \dfrac{\mu}{1-\mu}\sigma_V + \dfrac{1-2\mu}{1-\mu}\alpha P_P + \dfrac{E}{1-\mu^2}\varepsilon_h + \dfrac{\mu E}{1-\mu^2}\varepsilon_H \end{cases} \quad (6)$$

$$\sigma_V = \int_{H_0}^{0} \rho_0(h)g\,dh + \int_{H}^{H_0} \rho(h)g\,dh \quad (7)$$

$$\Delta\sigma_H = \sigma_h \quad (8)$$

wherein: $\mu$ is Poisson's ratio; E is the rock elastic modulus, MPa; $\varepsilon_H$ is the structural strain coefficient of the horizontal maximum principal stress; $\varepsilon_h$ is the horizontal minimum principal stress structural strain factor; $H_0$ is the depth of the logging starting point, m; $\rho_0(h)$ is the density of the logging section depth at point h, g/cm$^3$; $\rho(h)$ is the logging density at depth h, g/cm$^3$; g is the acceleration due to gravity, kg·m/s2.

Preferably, according to the production splitting coefficient of single-well multi-layer combined production, the fluid production volume of the fracturing section is split, and the rice fluid production index of each single layer is calculated.

Preferably, according to the evaluation index, combined with the meter fluid extraction index, the reservoir classification boundary value of the reservoir geological classification evaluation index is obtained.

Preferably, dividing the reservoir category according to the evaluation index of the reservoir geological classification, the reservoir category after the fracture of the low-permeability reservoir is obtained, and dividing the reservoir category according to the reservoir engineering classification index, the reservoir category after the fracture of the low-permeability reservoir is obtained, in such a manner that the two types of reservoirs are further integrated to obtain comprehensive geological-engineered favorable reservoirs after fractures in low-permeability reservoirs.

Compared with the prior art, the present invention has the following beneficial effects:

The present invention conducts comprehensive evaluation from the two aspects of both geology and engineering, which can predict and evaluate the fracturing effect of low-permeability reservoirs more scientifically and rationally, and provide an accurate basis for scientific and effectively selecting fracturing well and fracturing construction parameter.

BRIEF DESCRIPTION OF THE DRAWINGS

The drawings described here are used to provide a further understanding of the preferred embodiments of the present invention. The points do not constitute a limitation to the embodiment of the present invention.

DETAILED DESCRIPTION OF THE PREFERRED EMBODIMENT

In order to make the objectives, technical solutions, and advantages of the present invention clearer, the present invention will be further described in detail below with reference to the embodiments and drawings. The exemplary embodiments of the present invention and the description thereof are only used to explain the present invention, not as a limitation of the present invention.

Figure 1:
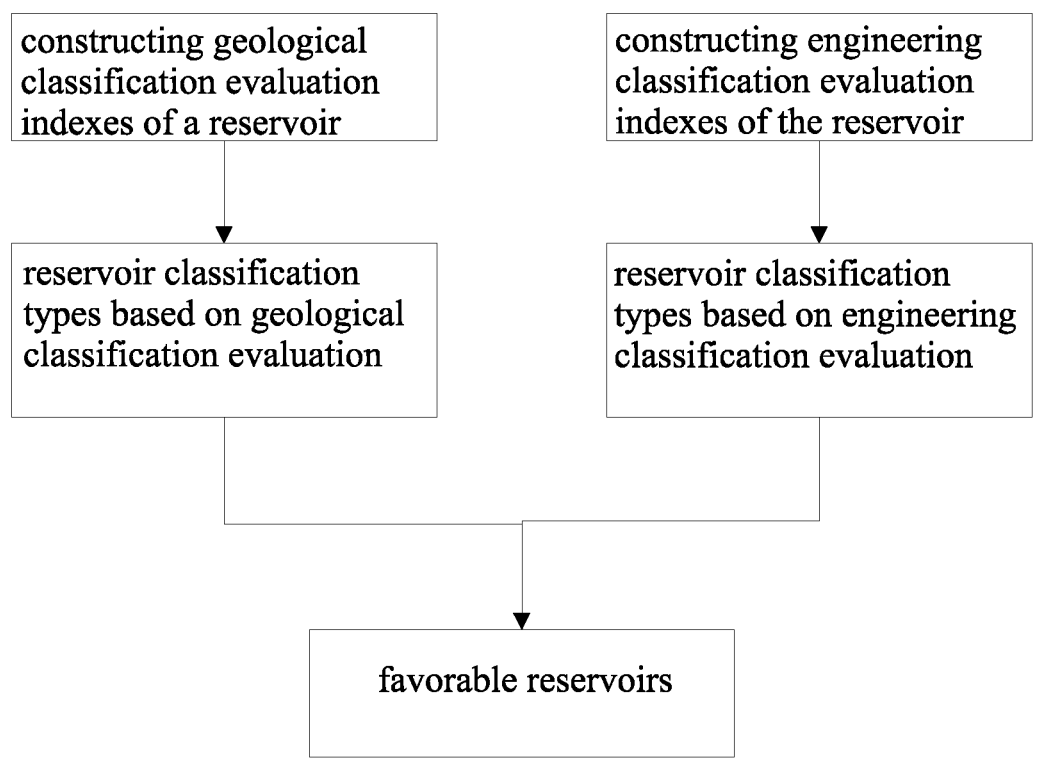
FIG. 1 is a flowchart of the present invention.

As shown in FIG. 1, a comprehensive geological-engineering classification evaluation method for low-permeability reservoirs, comprises steps of:

constructing geological classification evaluation indexes of a reservoir: adopting gray correlation method to obtain main controlling factors of reservoir geology of the low-permeability reservoirs that affects fracturing effects; based on the main controlling factors of the reservoir geology, constructing the geological classification evaluation indexes of low-permeability reservoirs by principal component analysis;

constructing engineering classification evaluation indexes of the reservoir: adopting gray correlation method to obtain main controlling factors of geomechanics of the low-permeability reservoirs that affects fracturing effects; based on the main controlling factors of geomechanics, constructing the engineering classification evaluation indexes of low-permeability reservoirs by an analytic hierarchy process; and according to classification limit values of the geological classification evaluation indexes of a reservoir and engineering classification evaluation indexes of a reservoir, achieving comprehensive geological-engineering classification of reservoir types.

Based on the method mentioned above, the present invention provides a preferred embodiment.

Embodiment 1

This Embodiment 1 is based on the low-permeability Wuerhe Formation reservoir in a western basin, and the steps are as follows:

Step (1): preparing experimental core data, geological data, fracturing data, geological logging report, oil test data, well logging material.

Step (2): determining the perforation and fracturing section of a single well according to the fracturing data, and determining the test well of the single well according to the oil test data; according to the logging data of a single well, obtaining the permeability of the test well section based on the fluid production volume of the section and the test well section; according to single well multi-layer combined production, the production splitting coefficient can be used to split the fluid production in the fracturing section, and splitting the single well fluid production into each small layer, and then calculating the rice liquid extraction index of each single layer; the yield splitting coefficient Mi is calculated using formula (1):

$$M_i = \frac{Q_i}{\sum_{i=1}^{o} Q_i} = \frac{K_i h_i}{\sum_{i=1}^{n} K_i h_i} \tag{1}$$

wherein Ki—effective permeability of the i-th small layer (mD); hi—thickness of the i-th small layer (m).

Step (3): acquiring sonic time difference AC, shale content VSH, and neutrons according to the conventional logging data of a single well in the study area CNL, density DEN, construct the calculation model of the pore structure index PIS of the study area, and the calculation model of the pore structure index PIS. (See formula (2));

$$PIS = 1.075 \times (AC + CNL)/DEN - 0.45 \times V_{SH} - 27.745 \tag{2}$$

Step (4): according to the geological logging report of the work area, obtain the measured pore pressure of the formation at a certain depth point in the formation, combined with the conventional; according to the effective stress theory, the sonic time difference AC, natural gamma GR, and density DEN at this depth point are obtained, and constructed according to the effective stress theory; the calculation model of formation pore pressure in the study area is shown in formula (4):

$$\sigma_e = 0.00556 DEPTH + 0.09717 AC + 11.2367 \ln(GR) - 64.7978 \tag{3}$$

$$P_p = \sigma V - \sigma e \tag{4}$$

wherein AC is the time difference of sound waves, GR is the natural gamma, DEN is the density, and $\sigma_v$ is the pressure of the overlying strata, $\sigma_e$ is the effective stress.

Step (5): obtaining the permeability PERM, porosity POR, and deep lateral resistivity of each single layer according to conventional logging data RT, sonic time difference AC, shale content $V_{SH}$, formation pore pressure $P_P$ and density DEN. Based on this, take the rice extraction index as the mother sequence, taking permeability, pore structure index, porosity, resistivity, acoustic jet lag, mud content, formation pore pressure and density as 6 sub-sequences, the correlation degree of each factor is calculated by applying the grey correlation analysis method to be 0.80, 0.72, 0.67, 0.64, 0.69, 0.57, 0.54, 0.51, then the degree of correlation between the geological factors of the reservoir and the rice production index is as follows: Permeability>Pore structure index>Acoustic time difference>Porosity>Resistivity>Shale content>Formation pore pressure>Density.

step (6): based on the understanding of the main controlling factors of reservoir geology, by principal component analysis to construct low-permeability reservoirs; wherein the quality classification evaluation index, the calculation model of the geological classification evaluation index of the low-permeability reservoir in this embodiment is shown in formula (5); according to the comment, the price index is combined with the rice extraction index to obtain the reservoir classification boundary value of the reservoir geological classification evaluation index, as shown in Table 1.

$$X_G = 0.227 \times POR + 0.917 \times PERM + 0.906 \times PIS \quad (5)$$

TABLE 1

Index Standards for Reservoir Geological Classification

| Classification | Classification Evaluation Indexes of Reservoir Geological Classification |
|---|---|
| Type I | >35 |
| Type II | 35~18 |
| Type III | 18~10 |
| Type IV | <10 |

Step (7): Based on the results of rock physics experiments and rock mechanics experiments, constructing the uniaxial compressive strength and resistance of the formation in the work area, logging calculation model of rock mechanical parameters such as tensile strength, elastic modulus, Poisson's ratio, brittleness index, etc.:

Uniaxial compressive strength of the formation: $\sigma_c = 135.1 e^{-0.039(AC/DEN)}$;

Tensile strength: $\sigma_t \div 9.8981 e^{-0.45(AC/DEN)}$;

Elastic modulus: $E = 72014 e^{-0.05 \ (AC/DEN)}$;

Poisson's ratio: $\mu = 0.9148 \ln(AC \cdot DEN) - 4.6872$;

Brittleness index: $B = 0.0013 E_s + 7.8134$.

Step (8): Based on the hydraulic fracturing construction curve, with the help of the classic combined spring model, as shown in equations (6) and (7), constructing a reasonable ground stress calculation model. Based on the in-situ stress data of multiple well test points, with the help of mathematics and rock mechanics, on the numerical simulation inversion analysis, the structural strain coefficient of the work area is obtained, as shown in Table 2.

Based on the calculated in-situ stress profile of a single well, the horizontal in-situ stress difference $\Delta\sigma$ of the interval can be obtained, that is, the horizontal in-situ stress difference is the horizontal maximum principal stress $\sigma$, the difference between H and the horizontal minimum principal stress $\sigma_h$. $\sigma_H$, σh are calculated by formula (6), and $\Delta\sigma$ is calculated by formula (8)

$$\begin{cases} \sigma_H = \frac{\mu}{1-\mu}\sigma_V + \frac{1-2\mu}{1-\mu}\alpha P_P + \frac{E}{1-\mu^2}\varepsilon_H + \frac{\mu E}{1-\mu^2}\varepsilon_h \\ \sigma_h = \frac{\mu}{1-\mu}\sigma_V + \frac{1-2\mu}{1-\mu}\alpha P_P + \frac{E}{1-\mu^2}\varepsilon_h + \frac{\mu E}{1-\mu^2}\varepsilon_H \end{cases} \quad (6)$$

$$\sigma_V = \int_{H_0}^{0} \rho_0(h)g d_h + \int_{H}^{H_0} \rho(h)g d_h \quad (7)$$

$$\Delta\sigma = \sigma_H - \sigma_h \quad (8)$$

wherein: μ is Poisson's ratio; E is the rock elastic modulus, MPa; $\varepsilon_H$ is the structural strain coefficient of the horizontal maximum principal stress; $\varepsilon_h$ is the structural strain coefficient of the horizontal minimum principal stress; $H_0$ is the depth of the logging starting point, m; $\rho_0(h)$ is the density of the logging section depth at point h, g/cm3; ρ(h) is the logging density at depth h, g/cm³; g is the acceleration due to gravity, kg·m/s².

TABLE 2

| Structural strain factor of the work area | | |
|---|---|---|
| No. of well | $\varepsilon_H(\times 10^{-3})$ | εh(×10⁻⁴) |
| 1# | 4.125 | 1.732 |
| 2# | 7.502 | 1.925 |

Step (9): Based on the rock mechanics and in-situ stress calculation models constructed in the fifth and sixth steps, combined with conventional logging data, the single well profile of geomechanical parameters in the work area can be obtained. On this basis, the water of each single layer is obtained according to conventional logging data. Flat stress difference, brittleness index, elastic modulus, tensile strength, uniaxial compressive strength, horizontal maximum principal stress, minimum horizontal principal stress geomechanical parameters such as force and Poisson's ratio. Based on this, the rice extraction index is used as the mother sequence, and the horizontal stress difference, brittleness index, elasticity modulus, tensile strength, uniaxial compressive strength, horizontal maximum principal stress, horizontal minimum principal stress and Poisson's ratio are sub-sequences. The gray correlation analysis method is used to calculate the correlation degree of each factor as 0.73, 0.72, 0.68, 0.65, 0.63, 0.57, 0.55, 0.52, then the degree of correlation between geophysical mechanics factors and the rice liquid extraction index in descending order is horizontal stress difference>brittleness index Number>Elastic modulus>Tensile strength>Uniaxial compressive strength>Horizontal maximum principal stress>Horizontal minimum principal stress>Poisson's ratio.

Step (10): Based on the understanding of the main controlling factors of geomechanics that affect the fracturing effect, use the analytic hierarchy process to obtain the low-permeability reservoir engineering classification evaluation index, the calculation model of the low-permeability reservoir engineering classification evaluation index in this example is shown in formula (9). According to this evaluation index, combined with the rice production index to obtain the reservoir classification limit value of the reservoir engineering classification evaluation index, see table 3.

$$X_E = 0.41\Delta\sigma_g + 0.29 B_g + 0.20\sigma_{tg} + 0.10 \ 6_{cg} \quad (9)$$

In formula (9): $\Delta\sigma_g$ is the normalized horizontal stress difference:

$$\Delta\rho_g = \frac{\Delta\rho_{imax} - \Delta\rho_i}{\Delta\rho_{imax} - \Delta\rho_{imin}}$$

$B_g$ is the normalized brittleness index Number:

$$B_g = \frac{B_i - B_{imin}}{B_{imax} - B_{imin}};$$

$\sigma_{tg}$ is the normalized tensile strength:

$$\sigma_t = \frac{\sigma_{timin} - \sigma_{ti}}{\sigma_{timax} - \sigma_{timin}};$$

$\sigma_{cg}$ is the normalized compressive strength:

$$\sigma_{cg} = \frac{\sigma_{cimax} - \sigma_{ci}}{\sigma_{cimax} - \sigma_{cimin}}.$$

TABLE 3

Reservoir Engineering Classification Evaluation Index Standard

| Classification | Classification Reservoir Fractured Reservoir Engineering Classification Evaluation Index |
|---|---|
| Type I | >0.6 |
| Type II | 0.6–0.43 |
| Type III | 0.43–0.3 |
| Type IV | <0.3 |

Step (11): according to conventional logging data, using the above-mentioned construction model, formula (5) and formula (9), reservoir geological classification index and reservoir engineering classification index is obtained.

Figure 2:
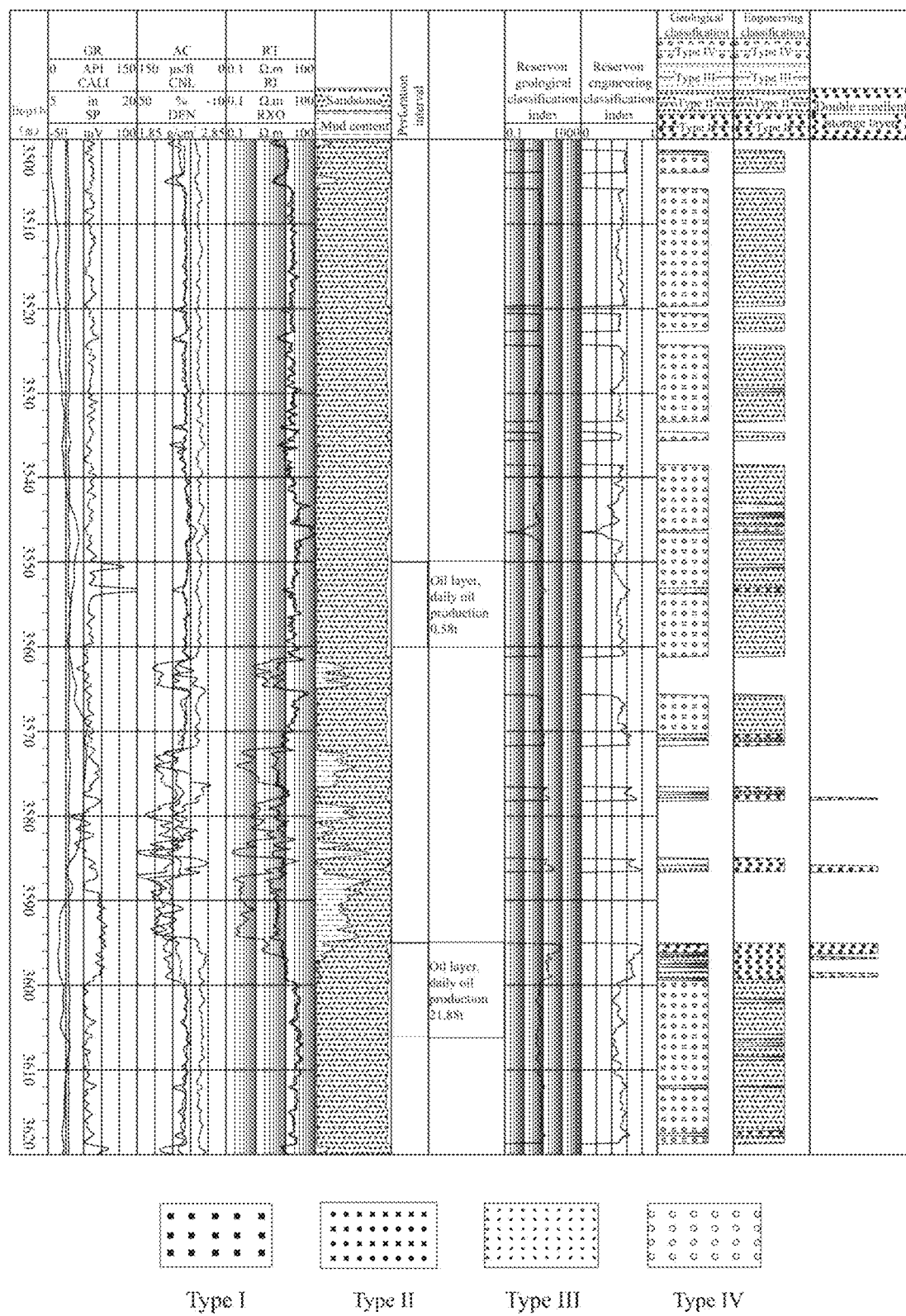
FIG. 2 shows the classification results of high-quality reservoir sections in a section of Well A.

Dividing the reservoir category according to the reservoir geological classification evaluation index, and obtain the reservoir category after the fracture of the low-permeability reservoir, meanwhile, dividing the reservoir categories according to the reservoir engineering classification indicators, wherein the reservoir categories after the fracture of the low-permeability reservoirs are obtained, and further combining the two types of reservoirs to obtain comprehensive geological-engineered high-quality reservoirs after fractures in low-permeability reservoirs, as shown in FIG. 2.

In the Embodiment 1, the reservoir category divided by the reservoir geological classification evaluation index and the reservoir engineering classification index are divided, the types of reservoirs are intersected to determine comprehensive geological and engineering high-quality reservoirs.

The present invention conducts comprehensive evaluation from two aspects of geology and engineering, and can predict and evaluate low permeability more scientifically and rationally.

The effect of permeable reservoir fracturing provides a more scientific and accurate basis for fracturing well selection and selection of fracturing construction parameters. One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A comprehensive geological-engineering classification evaluation method for low-permeability reservoirs, comprising steps of:
constructing geological classification evaluation indexes of a reservoir: adopting gray correlation method to obtain main controlling factors of reservoir geology of the low-permeability reservoirs that affects fracturing effects; based on the main controlling factors of the reservoir geology, constructing the geological classification evaluation indexes of low-permeability reservoirs by principal component analysis;
constructing engineering classification evaluation indexes of the reservoir: adopting gray correlation method to obtain main controlling factors of geomechanics of the low-permeability reservoirs that affects fracturing effects; based on the main controlling factors of geomechanics, constructing the engineering classification evaluation indexes of low-permeability reservoirs by an analytic hierarchy process; and
according to classification limit values of the geological classification evaluation indexes of a reservoir and engineering classification evaluation indexes of a reservoir, achieving comprehensive geological-engineering classification of reservoir types;
wherein the step of constructing geological classification evaluation indexes of a reservoir comprising:
S1: by the grey correlation analysis method, calculating a correlation degree between reservoir geological factors and rice production index to obtain the main controlling factors of the reservoir geology
S2: by the principal component analysis, constructing the geological classification evaluation indicators of low-permeability reservoirs.

2. The comprehensive geological-engineering classification evaluation method for low-permeability reservoirs, as recited in claim 1, wherein the reservoir geological factors comprises: permeability, pore structure index, porosity, resistivity, acoustic time, shale content, formation pore pressure and density.

3. The comprehensive geological-engineering classification evaluation method for low-permeability reservoirs, as recited in claim 2, wherein the pore structure index is calculated by a formula (2):

$$PIS = 1.075 \times (AC+CNL)/DEN - 0.45 \times V_{SH} - 27.745 \quad (2)$$

wherein in formula (2), PIS is the pore structure index, AC is the acoustic time, VSH is the shale content, CNL is neutrons, and DEN is density;
the formation pore pressure is calculated by a formula (3);

$$P_P = \sigma_V - \sigma_e \quad (3)$$

$$\sigma_e = 0.00556 DEPTH + 0.09717 AC + 11.2367 \ln(GR) - 64.7978 \quad (4)$$

wherein AC is the acoustic time, GR is natural gamma, $\sigma_v$ is a pressure of an overlying strata, $\sigma_e$ is an effective stress.

4. The comprehensive geological-engineering classification evaluation method for low-permeability reservoirs, as recited in claims 1, wherein according to the production splitting coefficient of single-well multi-layer combined production, the fluid production volume of the fracturing section is split, and the rice fluid production index of each single layer is calculated.

5. A comprehensive geological-engineering classification evaluation method for low-permeability reservoirs, comprising steps of:
constructing geological classification evaluation indexes of a reservoir: adopting gray correlation method to obtain main controlling factors of reservoir geology of the low-permeability reservoirs that affects fracturing effects; based on the main controlling factors of the reservoir geology, constructing the geological classification evaluation indexes of low-permeability reservoirs by principal component analysis;
constructing engineering classification evaluation indexes of the reservoir: adopting gray correlation method to obtain main controlling factors of geomechanics of the low-permeability reservoirs that affects fracturing effects; based on the main controlling factors of geomechanics, constructing the engineering classification evaluation indexes of low-permeability reservoirs by an analytic hierarchy process; and
according to classification limit values of the geological classification evaluation indexes of a reservoir and engineering classification evaluation indexes of a reservoir, achieving comprehensive geological-engineering classification of reservoir types;
wherein according to the evaluation index, combined with the meter fluid extraction index, the reservoir classification boundary value of the reservoir geological classification evaluation index is obtained.

6. A comprehensive geological-engineering classification evaluation method for low-permeability reservoirs, comprising steps of:
constructing geological classification evaluation indexes of a reservoir: adopting gray correlation method to obtain main controlling factors of reservoir geology of the low-permeability reservoirs that affects fracturing effects; based on the main controlling factors of the reservoir geology, constructing the geological classification evaluation indexes of low-permeability reservoirs by principal component analysis;
constructing engineering classification evaluation indexes of the reservoir: adopting gray correlation method to obtain main controlling factors of geomechanics of the low-permeability reservoirs that affects fracturing effects; based on the main controlling factors of geomechanics, constructing the engineering classification evaluation indexes of low-permeability reservoirs by an analytic hierarchy process; and
according to classification limit values of the geological classification evaluation indexes of a reservoir and engineering classification evaluation indexes of a reservoir, achieving comprehensive geological-engineering classification of reservoir types;
wherein dividing the reservoir category according to the evaluation index of the reservoir geological classification, the reservoir category after the fracture of the low-permeability reservoir is obtained, and dividing the reservoir category according to the reservoir engineering classification index, the reservoir category after the fracture of the low-permeability reservoir is obtained, in such a manner that the two types of reservoirs are further integrated to obtain comprehensive geological-engineered favorable reservoirs after fractures in low-permeability reservoirs.

* * * * *